United States Patent
Delsart et al.

(10) Patent No.: US 7,933,937 B2
(45) Date of Patent: Apr. 26, 2011

(54) SYSTEM AND METHOD FOR ASYNCHRONOUS PARALLEL GARBAGE COLLECTION

(75) Inventors: M. Bertrand Delsart, Grenoble (FR); Antonios Printezis, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 343 days.

(21) Appl. No.: 12/028,217

(22) Filed: Feb. 8, 2008

(65) Prior Publication Data
US 2009/0204654 A1 Aug. 13, 2009

(51) Int. Cl.
*G06F 7/00* (2006.01)
*G06F 17/30* (2006.01)

(52) U.S. Cl. ........................................................ 707/813
(58) Field of Classification Search .................... 707/813
See application file for complete search history.

(56) References Cited

U.S. PATENT DOCUMENTS

| | | | | |
|---|---|---|---|---|
| 5,842,016 | A * | 11/1998 | Toutonghi et al. | 718/106 |
| 6,253,215 | B1 * | 6/2001 | Agesen et al. | 1/1 |
| 6,341,293 | B1 * | 1/2002 | Hennessey | 1/1 |
| 2007/0136402 | A1 * | 6/2007 | Grose et al. | 707/206 |

* cited by examiner

*Primary Examiner* — Kuen S Lu
(74) *Attorney, Agent, or Firm* — Brooks Kushman P.C.

(57) ABSTRACT

A system and method for asynchronously graying and blackening objects in the marking phase of parallel garbage collection. The system and method use a matrix to control a series of linked list of work to be grayed and blackened. The threads of the garbage collector are each assigned entries within the matrix upon which they may either gray an entry in the linked list or blacken and entry on the linked list. Further restrictions upon the use of the matrix allow non-garbage collection thread to asynchronously or synchronously add objects to be processed by the garbage collector.

24 Claims, 8 Drawing Sheets

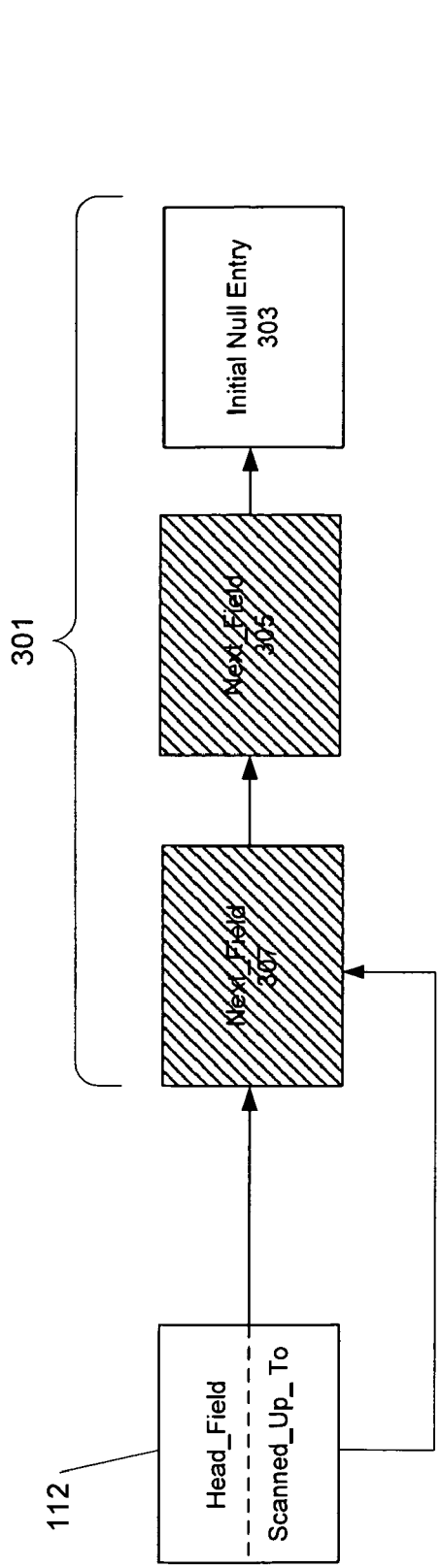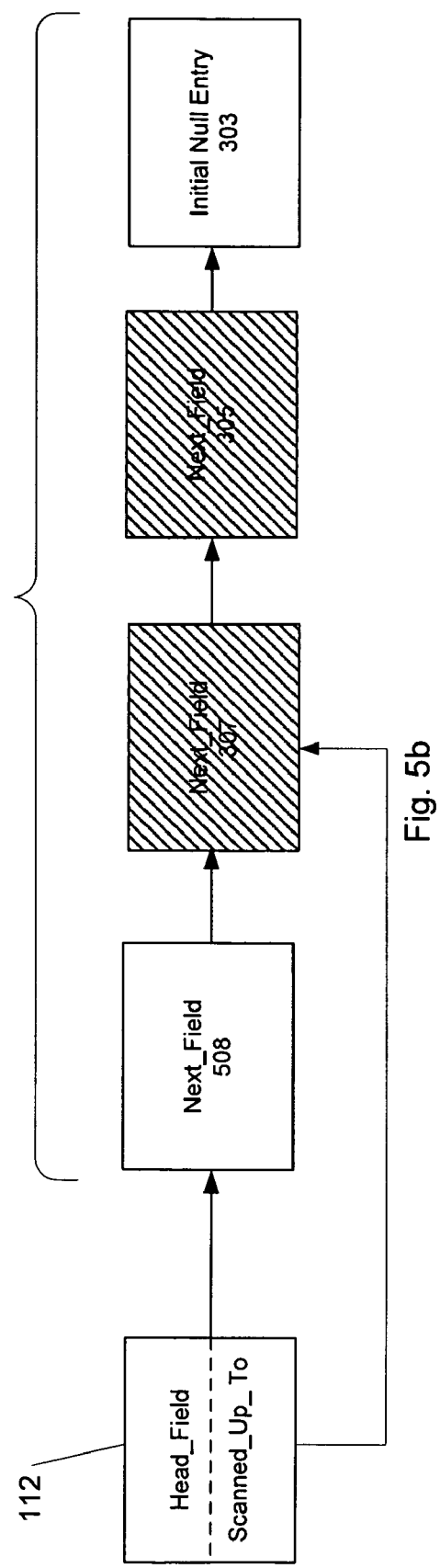
Fig. 5a
Fig. 5b

SYSTEM AND METHOD FOR ASYNCHRONOUS PARALLEL GARBAGE COLLECTION

FIELD OF THE INVENTION

The present invention generally relates to systems and method for garbage collection in a memory management system, and more particularly, to systems and techniques which provide load balancing of asynchronous concurrent marking of objects in a marking phase of garbage collection.

BACKGROUND OF THE INVENTION

A key feature of some modern programming languages such as Java is its garbage-collection process. Such a process takes care of releasing dynamically allocated memory that is no longer referenced. Because the heap is garbage-collected, programmers don't have to directly release allocated memory.

The name garbage collection implies that objects that are no longer needed by the program are "garbage" and can be thrown away. A more precise characterization might be recycling memory. In this manner, when an object is no longer referenced by the program, it may be recycled for further use as another object. The garbage collector must somehow determine which objects are no longer referenced by the program and make available the heap space occupied by such un-referenced objects.

Historically a single thread is used to perform garbage collection. When one thread performs garbage collection, there can be pauses or long waits while the collection is performed. In order to reduce the amount of time that a program pauses while garbage collection is performed, a plurality of thread may perform garbage collection to distribute the garbage collection work load. Concurrent garbage collection trades processor resources (which would otherwise be available to the application) for shorter collection pause times. Typically on an N processor system when the concurrent part of the collection is running, it will be using 1/Nth of the available processor power. On a uni-processor machine it would be fortuitous if it provided any advantage. The concurrent garbage collector also has some additional overhead costs that will take away from the throughput of the applications, such as the synchronization required between garbage collection threads. On a two processor machine there is a processor available for application threads while the concurrent part of the collection is running, so running the concurrent garbage collector thread does not "pause" the application. There may be reduced pause times as intended for the concurrent collector but again less processor resources are available to the application and some slowdown of the application should be expected.

Garbage collection may use several different methods to locate the objects to be processed. One such method is mark and sweep. Marking involves determining all the currently live (e.g. referenced) objects. Sweeping is the returning to the heap those objects which are no longer references on the stack or by other objects which are in turn referenced by some root object or the stack.

SUMMARY

A problem with concurrent garbage collection in a system such as a Java Virtual Machine (JVM) is that whenever a plurality of threads work on data structures, those data structures that may simultaneously be accessed must use some type of synchronization to prevent data corruption. Synchronization of threads requires considerable overhead and can cause multiple threads to run sequentially. Additionally, when multiple threads work on separate lists of work to be performed, the amount of work for each thread is balanced in relation to the other threads. Further, there are cases where marking of objects may need to be performed by threads other than garbage collection threads.

The present invention addresses these and other issues concerning the incompatibilities and difficulties encountered by using a matrix which points to linked lists of marked objects. Objects when initially added to a linked list of work "to do" (graying) mainly be added on a row of matrix of linked lists by a thread that corresponds to the row. When processing objects on the "to do" list (blackening) a thread may only process a column of the matrix that correspond to the thread.

More specifically, the present invention provides mechanisms and techniques that allow for asynchronously graying and blackening objects in the marking phase of parallel garbage collection. The system and method use a matrix to control a series of linked lists of work to be grayed and blackened. The threads of the garbage collector are each assigned entries within the matrix upon which they may either gray an entry in the linked list or blacken an entry on the linked list. Further restrictions upon the use of the matrix allow a non-garbage collection thread to asynchronously or synchronously add objects to be processed by the garbage collector.

According to one embodiment of the invention, a method is provided for facilitating in a memory management system asynchronously marking objects during multi-threaded garbage collection. The method comprises the steps of adding to a head of a linked list an object to be worked on by a garbage collection thread, the linked list determined by iterating a row of a matrix corresponding to the garbage collection thread to find a matrix entry; and finding work to be performed by the first thread by iterating across a column of the matrix corresponding to the garbage collection thread and updating a worked on position indicator of objects in the link list indicated by a linked list referenced by a matrix entry. Further, only the garbage collection thread may add objects in the link list referenced by matrix entries in the row corresponding to the garbage collection thread, and only the garbage collection thread may find objects in the link list referenced by matrix entries in the column corresponding to the garbage collection thread. The number of rows and number of columns of the matrix equals the number of garbage collection threads. Further, the garbage collection thread adds to the head of the linked list, the garbage collection thread omits matrix entries where the column corresponds to the garbage collection thread. The method further comprises adding the object to the linked list by another than garbage collection thread, the link list referenced by a matrix entry, wherein an index to determine the matrix is the same for both the column and the row. Further in the step of finding work to be performed further performs the step of: searching for further object references in the object; and adding the further object referenced to the head of a linked list an object to be worked on. Further in an embodiment threads other than garbage collection thread is a plurality of threads, synchronization is performed when updating the head of a list.

Another embodiment includes a method of facilitating in a memory management system marking objects during multi-threaded garbage collection, the method comprising: adding asynchronously to a head of a linked list an object to be worked on by a garbage collection thread, the linked list determined by iterating a row of a matrix corresponding to the garbage collection thread to find a matrix entry; finding work to be performed by the first thread by iterating across a column of the matrix corresponding to the garbage collection thread and updating asynchronously a worked on position indicator of objects in the link list indicated by a linked list referenced by a matrix entry; and finding additional work to be performed by a first thread by iterating across a column unassigned to any to any garbage collection thread and updating synchronously a worked on position indicator of objects in the link list indicated by a linked list referenced by a matrix entry.

Another embodiment includes a method of facilitating in a memory management system marking objects during multi-threaded garbage collection, the method comprising: adding asynchronously to a head of a linked list an object to be worked on by a garbage collection thread, the linked list determined by iterating a row of a matrix corresponding to the garbage collection thread to find a matrix entry; finding work to be performed by the first thread by iterating across a column of the matrix corresponding to the garbage collection thread and updating synchronously a worked on position indicator of objects in the link list indicated by a linked list referenced by a matrix entry; and finding, upon exhaustion of work to be performed by the first thread by iterating across a column of the matrix corresponding to the garbage collection thread, other work to be performed by the first thread by iterating across a column of the matrix corresponding to another garbage collection thread and updating synchronously a worked on position indicator of objects in the link list indicated by a linked list referenced by a matrix entry.

Other embodiments include a computer system configured as a management station to perform all of the aforementioned methods via software control, or via hardware and/or software configured to perform those methods and the techniques disclosed herein as the invention.

One such embodiment includes a memory management system asynchronously marking objects during multi-threaded garbage collection, the system comprising: a processor operatively coupled to a memory, the processor configured to implement computer-readable code, the computer-readable code configured to: adding to a head of a linked list an object to be worked on by a garbage collection thread, the linked list determined by iterating a row of a matrix corresponding to the garbage collection thread to find a matrix entry; and finding work to be performed by the first thread by iterating across a column of the matrix corresponding to the garbage collection thread and updating a worked on position indicator of objects in the link list indicated by a linked list referenced by a matrix entry.

Other embodiments of the invention that are disclosed herein include software programs to perform the operations summarized above and disclosed in detail below. More particularly, a computer program product is disclosed which has a computer-readable medium including computer program logic encoded thereon to provide the methods for facilitating in a memory management system asynchronously marking objects during multi-threaded garbage collection according to this invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the methods of this invention typically performs (e.g., executes, runs, or is otherwise operated) on a computer system coupled to a data storage or other type of network. The computer system is generally networked but is typically a dedicated computer system, personal computer or workstation operated by a network or systems administrator or manager. In alternative arrangements however, the computer of this invention may reside on a computer system located elsewhere on the network and the user (e.g., systems manager) that run the program requiring garbage collection may be located elsewhere on the network and may be communicating with the program over a network connection (e.g., WWW or other browser-type interface, command-line interface, messaging interface, E-Mail, or another protocol or interface).

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 5a shows a representation of a linked list in which an entry is blackened.

FIG. 5b shows a representation of a linked list in which an entry is added and another entry is blackened.

DETAILED DESCRIPTION

The present invention provides techniques and mechanisms that allow asynchronous parallel processing of objects added to a "to do" list for garbage collection. The process has two phases that may be processed concurrently. The first phase is the graying of an object that consists of adding an object to a list of work to be processed. The second is the blackening of the object by adding objects that the first object references to the list of work to do.

Figure 1:
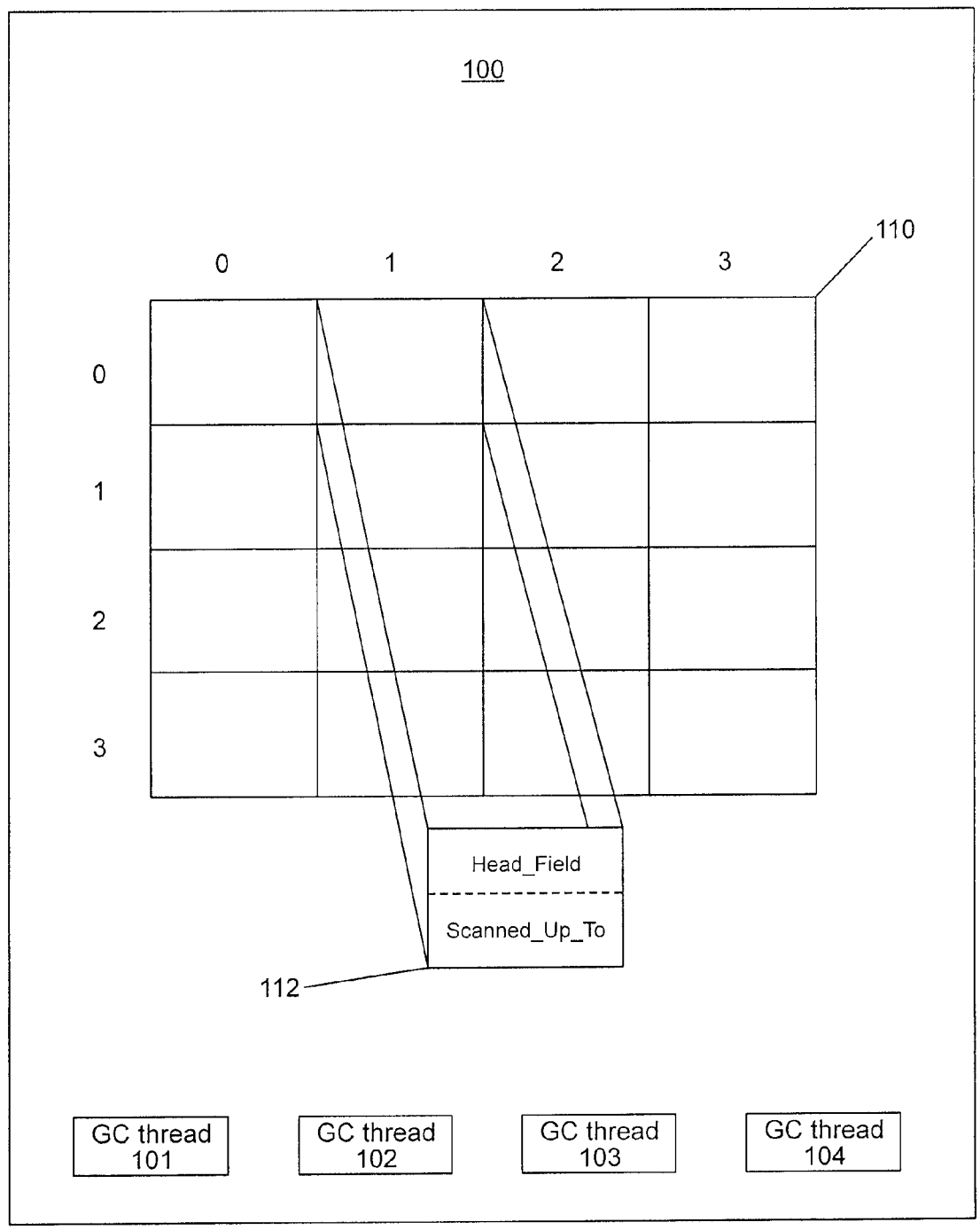
FIG. 1 shows a representation of a matrix used by the garbage collection threads of a parallel garbage collection system.

FIG. 1 illustrates a representative garbage collection unit of the present invention. Garbage collector 100 contains matrix 110 and garbage collection threads 101-104. Matrix 110 contains an equal number of rows and columns. Where the number of garbage collection threads 101-104 is four, the number of rows is four (0 . . . 3) and the number of columns is four (0 . . . 3).

Matrix entry 112 is representative of each matrix entry in matrix 110. The matrix entry contains both a head_field and scanned_up_to field. A thread of the present garbage collector when adding work to a linked list of objects only adds entries to linked lists in the row corresponding to that thread. Thus, when thread 101 wants to add work to a linked list, it does so by iterating across row 0 of matrix 110, the corresponding row for thread 101, when the next entry is reached it adds the object to the linked list pointed to by that entry. Likewise, thread 102 iterates across row 1 of matrix 110, thread 103 across row 2 of matrix 110 and thread 104 across row 3 of matrix 110. By enforcing such a rule that a thread may only iterate across it corresponding row, the head_field manipulated when adding an element to a linked list of work need not be protected from interference by other threads, as only one thread ever updates these fields.

A further restriction is to not allow a thread to update a linked list referenced by the matrix entry where the column corresponds to the thread. Thus, when thread 101 iterates across row 0 of matrix 110, it never accesses the entry in column 0. Likewise, thread 102 never updates matrix entry [1:1] of matrix 110, thread 103 never updates matrix entry [2:2] of matrix 110 and thread 104 never updates matrix entry [3:3] of matrix 110.

Figure 2:
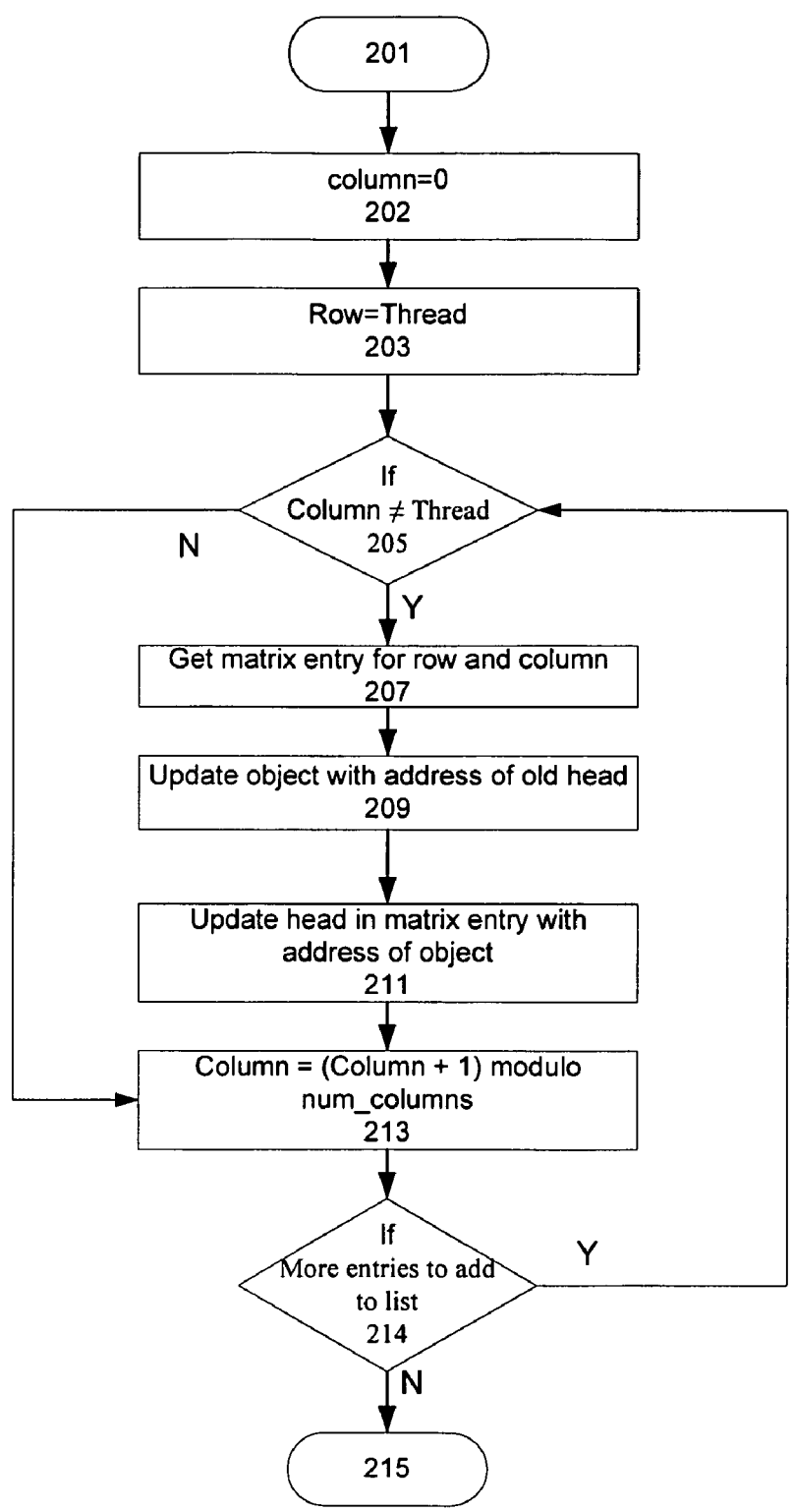
FIG. 2 illustrates the addition of objects to a grid.

FIG. 2 illustrates the addition of a number of objects in the grid in a garbage collection system. As a first step function 200 is entered at step 201. Set the initial column to be processed to zero 202. Set the row equal to the thread at step 203. If the column of the row corresponds to the id of the thread 205 then skip to process the next column 213. Otherwise, get the matrix entry for the current row and column 207. For the present object being added, insert the address of the old head in the object 209. Then update the head in the matrix entry with address of the present object 211. Increment the column being processed and if the last column is reached then wrap the column variable to process the first column 213. If there are more entries to be added to the list 214, then go process the next entry 205, otherwise end processing 215. It is well understood in the art that an alternative implementation that allows only a single object to be added to the grid could also be developed.

Figure 3A:
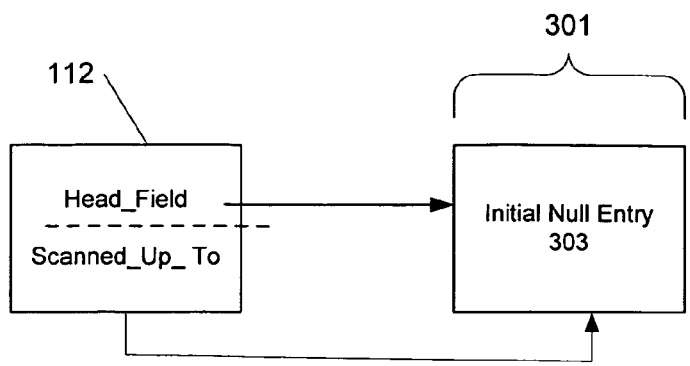
FIG. 3a shows a representation of a linked list with no entries.
Figure 3B:
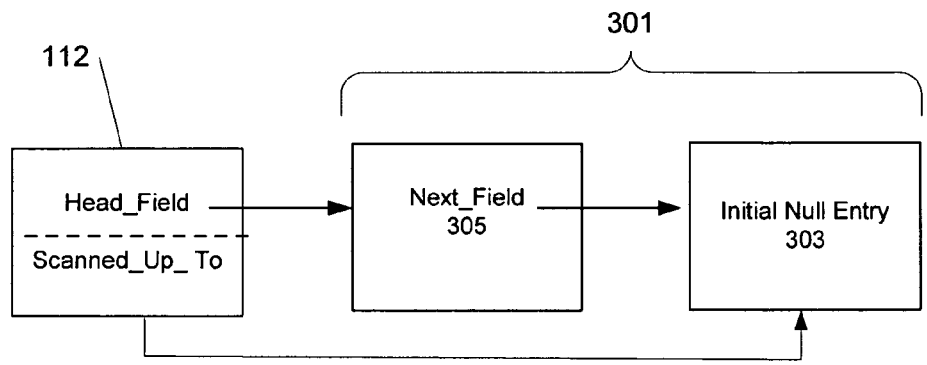
FIG. 3b shows a representation of a linked list with a single entry added.
Figure 3C:
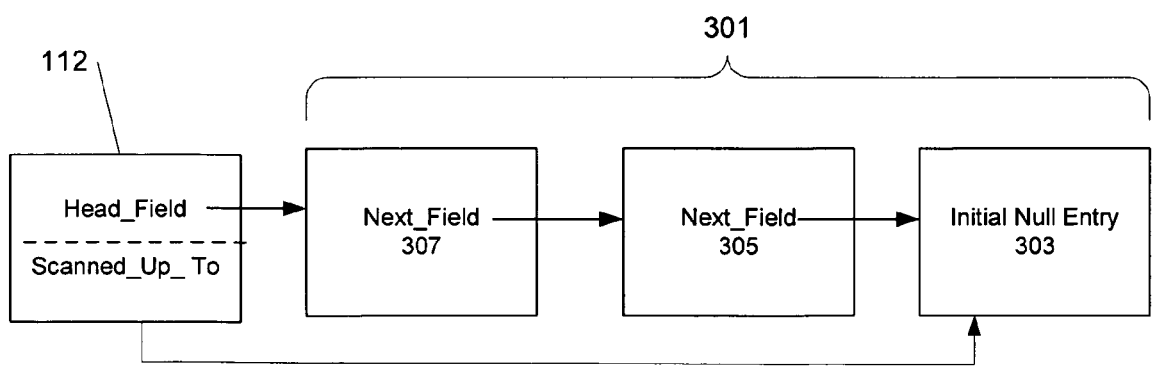
FIG. 3c shows a representation of a linked list with a second entry added.

FIGS. 3a-3c illustrate the adding of two objects to a linked list. Thread 101 of FIG. 1 iterates across row 0 and comes to the first column that thread 101 may use which is column 1 (Matrix entry 112). As in FIG. 3a, when initially created matrix entry 112 contains a head field that point to null entry 303 of linked list 301. The scanned_up_to field of matrix entry 112 also contains a pointer to null entry 303 of linked list 301.

In FIG. 3b, the first object is added to the linked list 301 by updating the next_field of object 305 to point to old list head which is null entry 303 and then updating the head_field of matrix entry 112 to point to object 305. At this point linked list entry 301 contains 1 entry.

In FIG. 3c, second object 307 is added to linked list 301 by updating the next field 307 to point at the old list head which is object 305 and then updating the head_field of matrix entry 112 to point to object 307. As described above, only thread 101 can update the head_field of matrix entry 112 or the next field of entries in linked list 301, thereby guaranteeing that no data of these fields can be overwritten by another thread updating the same fields.

For the sake of brevity, two entries were shown being added to linked list 301 to illustrate the workings of the linked list. In one embodiment of the present the second object 307 would have been added as the first entry to the link list pointed to by the matrix entry [0:2] after iterating to the next matrix entry of matrix 110. By advancing to the next matrix entry and adding the object to the list there, the linked lists of matrix 110 grow in an evenly distributed manner.

Figure 4:
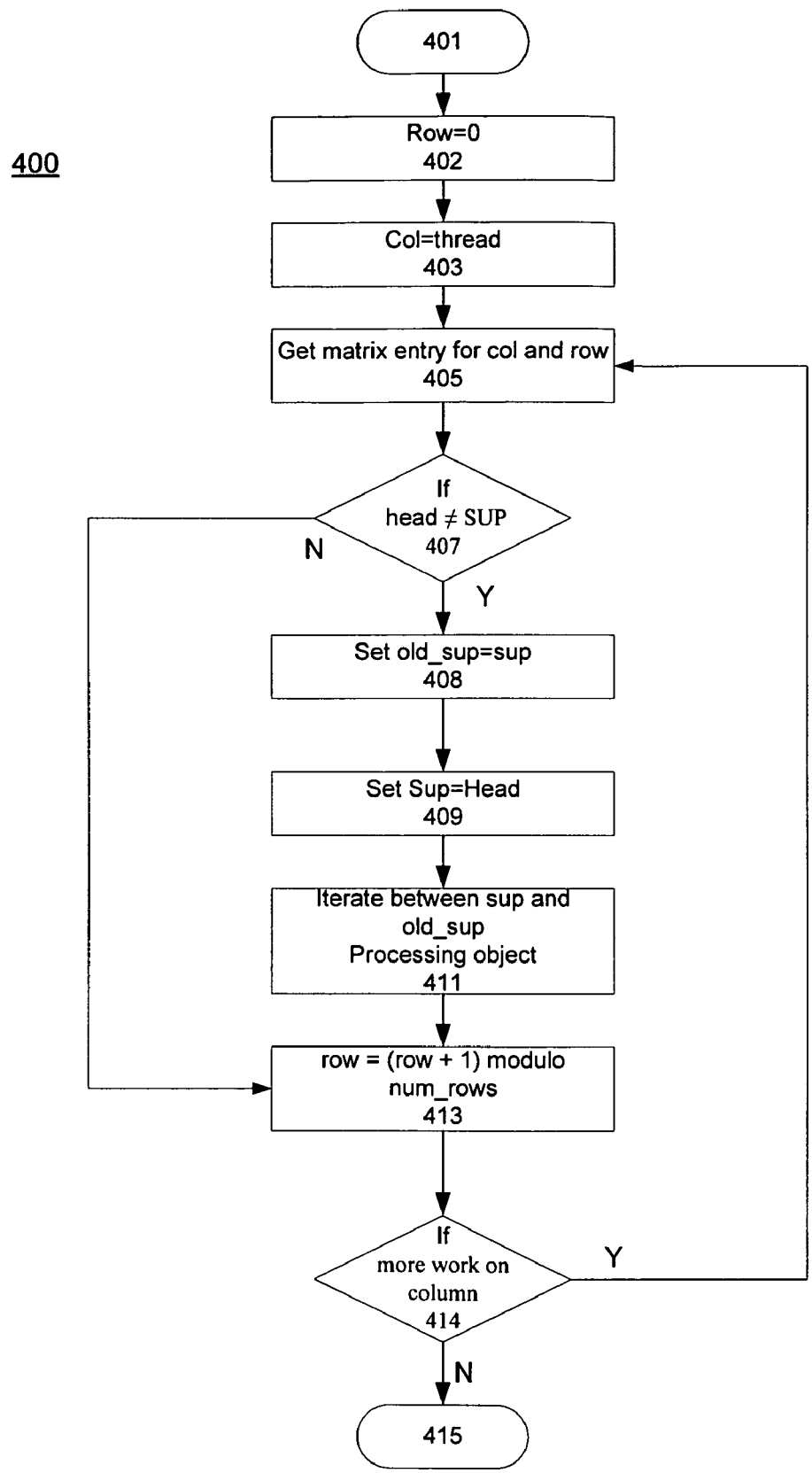
FIG. 4 is a flow chart of the blackening of objects.

FIG. 4 is a flow chart of a process of blackening objects in the grid of a garbage collection system. Function 400 begins by entering the blackening phase at step 401. The columns of matrix 110 are iterated over by first setting the row equal to zero 402 and setting the column id to the current thread id at step 403. The entry for the matrix 110 at [col:row] is retrieved at step 405. If the value of head in the retrieved matrix entry is equal to scanned_up_to (SUP) at step 407, then there are no objects to be blackened in this list at step 413. Otherwise, set old_sup to the value of sup at step 408, then set SUP to the value of the head in the matrix entry at step 409 and get the value of SUP as old SUP. Then iterate between the value of sup and old_sup at step 411 and process the object by adding it to the list of objects which need to be grayed. Increment the row to process the next matrix entry of the column and wrap to the first row if the last row has been processed at step 413. At step 414 determine if there is still more work to process on the column, if so then process the next entry at step 405. Otherwise end processing at step 415.

FIGS. 5a and b illustrate the blackening and graying of entries in a list. FIG. 5a shows a linked list with the same elements of the linked list in FIG. 3c. In the process of FIG. 4, thread 102 of FIG. 1 iterates down column 1 and comes to the first row that thread 102 may use which is row 0 (Matrix entry 112). Matrix entry 112 has a scanned up to field that points to initial null entry 303. The values of the current scanned up to and head are stored in thread local memory. The head of entry 112 is compared to the scanned up to field of entry 112, if these values are not equal then the scanned up to value in entry 112 is modified to be the value of head kept in thread local memory. Then elements 305 and 307 are iterated over such that entries that these elements point to are added to the list of grayed entries. First element 307 is blackened and then element 305.

FIG. 5b illustrates what the linked list 301 looks like after another entry is added according to the process of FIG. 2. The head field is modified to point to element 508 and the next field of element 508 to point to element 307. As different threads gray and blacken entries, the processes in FIGS. 2 and 4 can occur concurrently such that modifications to the linked list 301 in FIGS. 5a and b can occur at the same time without the need to synchronize the threads.

Figure 6:
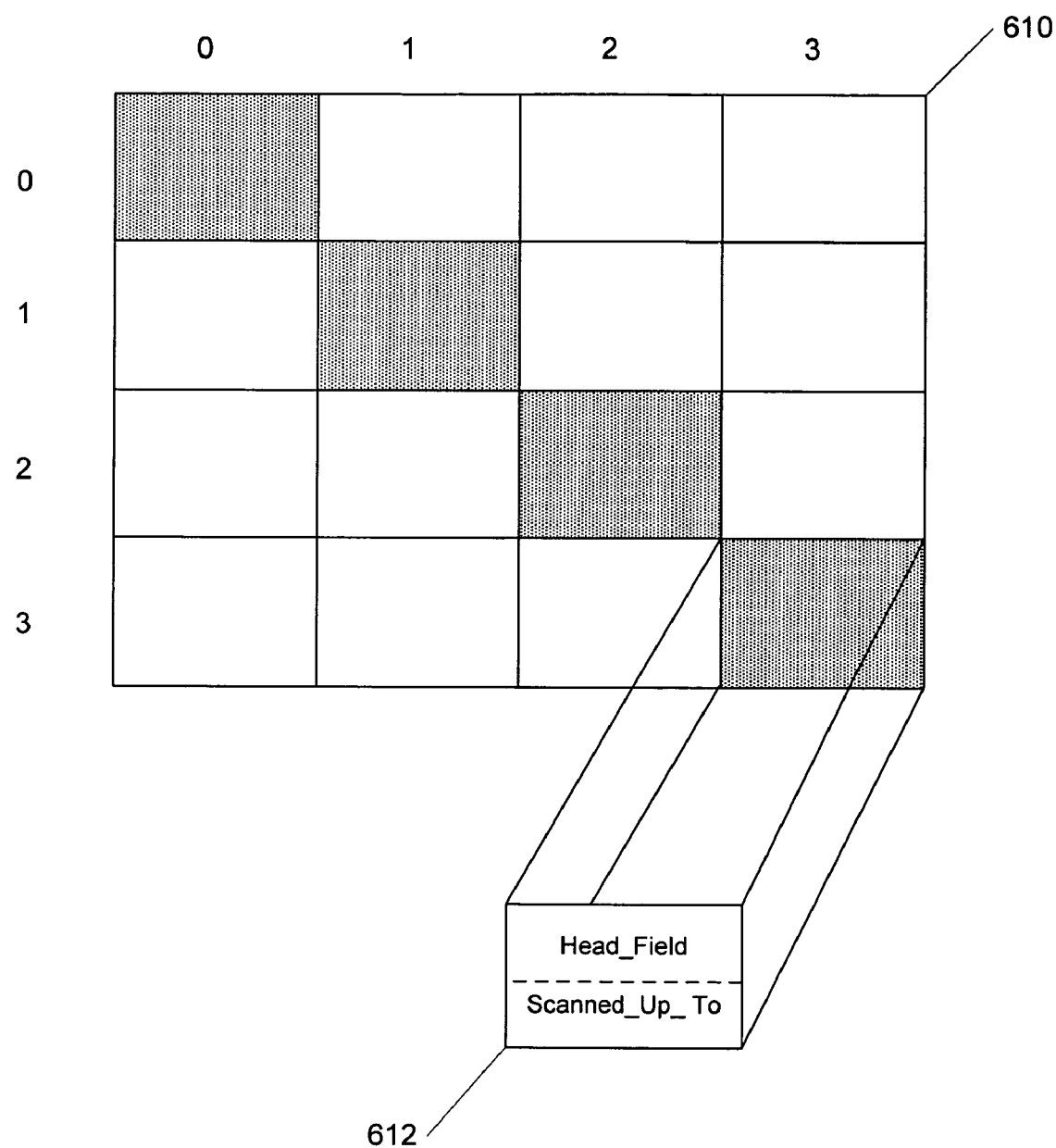
FIG. 6 shows a representation of a matrix used by the non-garbage collection threads of a parallel garbage collection system.

FIG. 6 illustrates the matrix of the present invention where some matrix entries do not have objects added to the linked list for graying by garbage collection threads. As described above, garbage collection thread 1 does not add objects to the linked list for matrix entry [0:0] of matrix 610, garbage collection thread 2 does not add entries to matrix entry [1:1] of matrix 610, garbage collection thread 3 does not add entries to matrix entry [2:2] of matrix 610 and garbage collection thread 4 does not add entries to matrix entry [3:3] of matrix 610. The reason for prohibiting the garbage collection threads from adding to elements on the diagonal of matrix 610 is to allow threads outside the context of garbage collection to add elements. Such addition can occur concurrently with garbage collection threads 101-104 adding elements or for instance, during the serial phase of a system, prior to the garbage collection threads being created. A single thread may then add objects to any list of the matrix entries on the diagonal. If the garbage collection threads are created while this is occurring, the serial thread and the parallel garbage collection threads will not be graying objects on the same linked list. It is obvious to those of ordinary skill in the art, if there is more than one non-garbage collection thread adding to the linked lists pointed to by matrix entries on the diagonal of matrix 612 then a means of synchronization between such non-garbage collection threads would be required. The garbage collection threads would still be free to add entries to the linked list of the other matrix entries without synchronization as described above.

Figure 7:
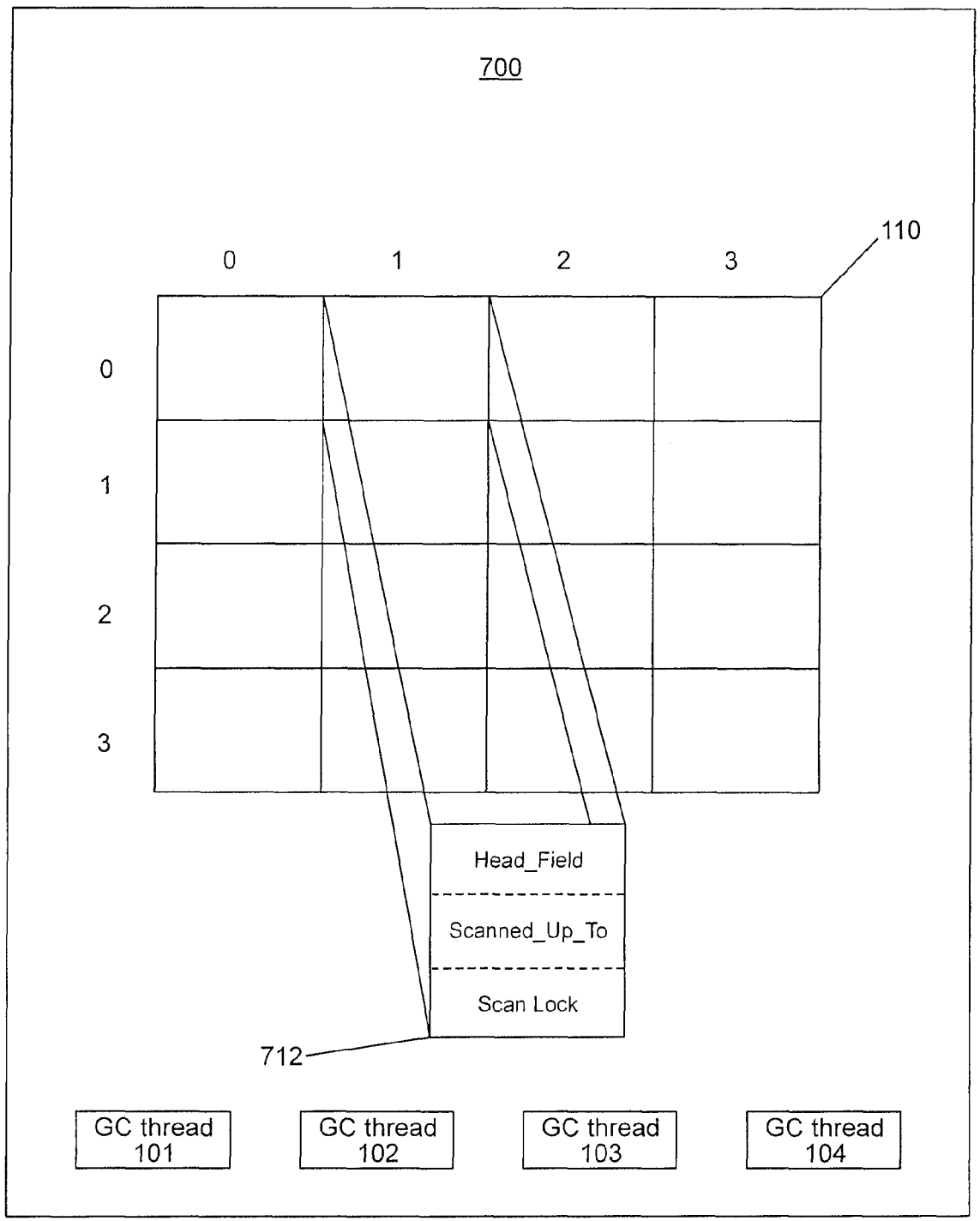
FIG. 7 shows a representation of a matrix used by the garbage collection threads where entries may be blackened by threads not owning the column of the matrix.

FIG. 7 illustrates another embodiment of the present invention in which a thread upon running out of elements to be blackened in its own column will take work from the column of another thread (i.e. stealing). In order to take entries according to the process of FIG. 4, synchronization between threads is performed. Such that if thread 101 which looks for work in column zero of matrix 710, runs out of entries to process it will begin to look for work in column 1, the column normally processed by thread 102. In such a case the process 400 would perform the steps 407 and 409 using an atomic compare-and-swap such that thread 101 would have the exclusive read-update of SUP. One skilled in the art would also recognize that synchronization using a lock, semaphore or mutex could be used around these steps as well. If a lock, semaphore or mutex is used, the lock can be made part of a matrix entry 712 or can be held in other memory associated with the entry.

Figure 8:
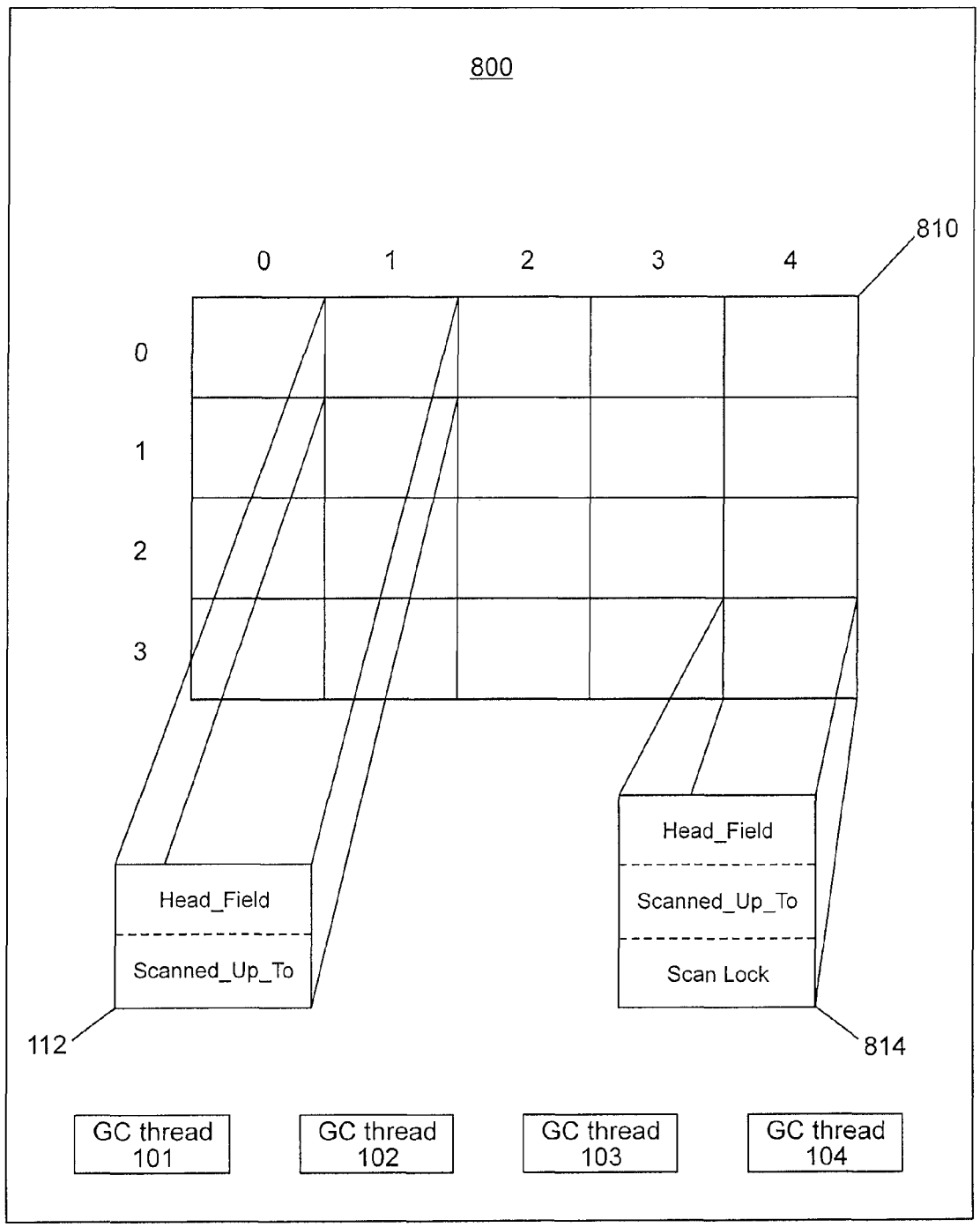
FIG. 8 shows a representation of a matrix used by the garbage collection threads of a parallel garbage collection system where an additional column is added to allow stealing of entries to be blackened.

FIG. 8 illustrates another embodiment of the present invention in which an additional column is added to matrix 810. When executing the process 200 thread 101 adds entries to columns 0 to 4 of row zero. Threads 102-104 add entries for columns 0 to 4 for their respective rows. No synchronization is required to add these elements (i.e. graying). When scanning for elements (i.e. blackening) according to process 400, threads scan for entries to process in their corresponding column. No synchronization is required to process these entries. If a thread finds that no entries are left in its corresponding column, then entries can be stolen from column 4. As more than one thread can attempt to harvest from such additional column 4 or columns (not shown), synchronization with an atomic compare-and-swap or scan lock as in matrix entry 814 is required. It is understood by those in the art that the lock may be part of matrix entry 814 or may be located in other data structures at different granularity such the column level or for the entire matrix. In an alternate embodiment synchronization could be performed on all entries not just those in additional column 4.

Those skilled in the art will understand that there can be many variations made to the operations of the parallel garbage collector explained above while still achieving the same objectives of the invention. For instance, the structures of the present invention could be implemented where the thread graying an object could work on columns rather rows as described above. In such an embodiment, the thread blackening an object would iterate rows not column. Such variations are intended to be covered by the scope of this invention. As such, the foregoing description of embodiments of the invention are not intended to be limiting. Rather, any limitations to embodiments of the invention are presented in the following claims.

What is claimed is:

1. A method of facilitating in a memory management system asynchronously marking objects during multi-threaded garbage collection, the method comprising:
    adding to a head of a linked list an object to be worked on by a garbage collection thread, the linked list determined by iterating a row of a matrix corresponding to the garbage collection thread to find a matrix entry; and
    finding work to be performed by the first thread by iterating across a column of the matrix corresponding to the garbage collection thread and updating a worked on position indicator of objects in the linked list indicated by a linked list referenced by a matrix entry.

2. The method of claim 1, wherein the number of rows and number of columns of the matrix equals the number of garbage collection threads.

3. The method of claim 1, wherein the garbage collection thread adds to the head of the linked list, the garbage collection thread omits matrix entries where the column corresponds to the garbage collection thread.

4. The method of claim 3, further comprising:
    adding the object to the linked list by an other than garbage collection thread, the link list referenced by a matrix entry, wherein an index to determine the matrix are equal values for both the column and the row.

5. The method of claim 4, wherein the other than garbage collection thread is a plurality of threads, and
    synchronization is performed when updating the head of a list.

6. The method of claim 1, wherein the finding work to be performed further performs the step of:
    searching for further object references in the object; and
    adding the further object referenced to the head of a linked list an object to be worked on.

7. The method of claim 1, wherein only the garbage collection thread may add objects in the link list referenced by matrix entries in the row corresponding to the garbage collection thread, and
    only the garbage collection thread may find object in the link list referenced by matrix entries in the column corresponding to the garbage collection thread.

8. A memory management system asynchronously marking objects during multi-threaded garbage collection, the system comprising:
    a processor operatively coupled to a memory, the processor configured to implement computer-readable code, the computer-readable code configured to:
    adding to a head of a linked list an object to be worked on by a garbage collection thread, the linked list determined by iterating a row of a matrix corresponding to the garbage collection thread to find a matrix entry; and
    finding work to be performed by the first thread by iterating across a column of the matrix corresponding to the garbage collection thread and updating a worked on position indicator of objects in the linked list indicated by a linked list referenced by a matrix entry.

9. The system of claim 8, wherein the number of rows and number of columns of the matrix equals the number of garbage collection threads.

10. The system of claim 8, wherein the garbage collection thread adds to the head of the linked list, the garbage collection thread omits matrix entries where the column corresponds to the garbage collection thread.

11. The system of claim 10, further comprising:
adding the object to the linked list by an other than garbage collection thread, the link list referenced by a matrix entry, wherein an index to determine the matrix are equal values for both the column and the row.

12. The system of claim 8, wherein the finding work to be performed further performs the step of:
searching for further object references in the object; and
adding the further object referenced to the head of a linked list an object to be worked on.

13. The system of claim 8, wherein only the garbage collection thread may add objects in the link list referenced by matrix entries in the row corresponding to the garbage collection thread, and
only the garbage collection thread may find object in the link list referenced by matrix entries in the column corresponding to the garbage collection thread.

14. The system of claim 8, wherein the other than garbage collection thread is a plurality of threads, and
synchronization is performed when updating the head of a list.

15. A computer readable medium having computer readable code stored thereon for asynchronously marking objects during multi-threaded garbage collection comprising:
a processor operatively coupled to a memory, the processor configured to implement computer-readable code, the computer-readable code configured to: adding to a head of a linked list an object to be worked on by a garbage collection thread, the linked list determined by iterating a row of a matrix corresponding to the garbage collection thread to find a matrix entry; and
finding work to be performed by the first thread by iterating across a column of the matrix corresponding to the garbage collection thread and updating a worked on position indicator of objects in the linked list indicated by a linked list referenced by a matrix entry.

16. The computer readable medium of claim 15, wherein the number of rows and number of columns of the matrix equals the number of garbage collection threads.

17. The computer readable medium of claim 15, wherein the garbage collection thread adds to the head of the linked list, the garbage collection thread omits matrix entries where the column corresponds to the garbage collection thread.

18. The computer readable medium of claim 17, further comprising:
adding the object to the linked list by an other than garbage collection thread, the link list referenced by a matrix entry, wherein an index to determine the matrix are equal values for both the column and the row.

19. The computer readable medium of claim 15, wherein the finding work to be performed further performs the step of:
searching for further object references in the object; and
adding the further object referenced to the head of a linked list an object to be worked on.

20. The computer readable medium of claim 15, wherein only the garbage collection thread may add objects in the link list referenced by matrix entries in the row corresponding to the garbage collection thread, and
only the garbage collection thread may find object in the link list referenced by matrix entries in the column corresponding to the garbage collection thread.

21. A method of facilitating in a memory management system marking objects during multi-threaded garbage collection, the method comprising:
adding to a head of a linked list an object to be worked on by a garbage collection thread, the linked list determined by iterating a row of a matrix corresponding to the garbage collection thread to find a matrix entry;
finding work to be performed by the first thread by iterating across a column of the matrix corresponding to the garbage collection thread and updating asynchronously a worked on position indicator of objects in the linked list indicated by a linked list referenced by a matrix entry; and
finding additional work to be performed by a first thread by iterating across a column unassigned to any to any garbage collection thread and updating synchronously a worked on position indicator of objects in the link list indicated by a lined list reference by a matrix entry.

22. The method of claim 21, wherein the number of rows of the matrix equals the number of garbage collection threads and number of columns of the matrix is greater than the number of garbage collection threads.

23. A method of facilitating in a memory management system marking objects during multi-threaded garbage collection, the method comprising:
adding to a head of a linked list an object to be worked on by a garbage collection thread, the linked list determined by iterating a row of a matrix corresponding to the garbage collection thread to find a matrix entry;
finding work to be performed by the first thread by iterating across a column of the matrix corresponding to the garbage collection thread and updating synchronously a worked on position indicator of objects in the linked list indicated by a linked list referenced by a matrix entry; and
finding, upon exhaustion of work to be performed by the first thread by iterating across a column of the matrix corresponding to the garbage collection thread, other work to be performed by the first thread by iterating across a column of the matrix corresponding to another garbage collection thread and updating synchronously a worked on position indicator of objects in the link list indicated by a linked list referenced by a matrix entry.

24. The method of claim 23, wherein the number of rows and number of columns of the matrix equals the number of garbage collection threads.

* * * * *

UNITED STATES PATENT AND TRADEMARK OFFICE
CERTIFICATE OF CORRECTION

| | | |
|---|---|---|
| PATENT NO. | : 7,933,937 B2 | Page 1 of 1 |
| APPLICATION NO. | : 12/028217 | |
| DATED | : April 26, 2011 | |
| INVENTOR(S) | : M. Bertrand Delsart et al. | |

It is certified that error appears in the above-identified patent and that said Letters Patent is hereby corrected as shown below:

Column 9, Line 15, Claim 13:
Delete "object" and insert -- objects --.

Column 9, Line 46, Claim 18:
After "other than" insert -- a --.

Column 10, Line 5, Claim 20:
Delete "object" and insert -- objects --.

Column 10, Line 11, Claim 21:
After "adding" insert -- synchronously --.

Column 10, Line 22, Claim 21:
After "to any" delete "to any" (second occurrence).

Column 10, Line 25, Claim 21:
After "list indicated by a"
Delete "lined" and insert -- linked --.

Column 10, Line 33, Claim 23:
After "adding" insert -- synchronously --.

Signed and Sealed this
Thirteenth Day of September, 2011

David J. Kappos
*Director of the United States Patent and Trademark Office*